United States Patent
Ohta et al.

(10) Patent No.: US 9,977,237 B2
(45) Date of Patent: May 22, 2018

(54) OPTICAL SCANNING DEVICE, AND IMAGE FORMING APPARATUS EQUIPPED WITH THE SAME

(71) Applicant: CANON KABUSHIKI KAISHA, Tokyo (JP)

(72) Inventors: Mitsuhiro Ohta, Mishima (JP); Akihiro Fukutomi, Tokyo (JP); Tomoyuki Kawano, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 2 days.

(21) Appl. No.: 15/199,713

(22) Filed: Jun. 30, 2016

(65) Prior Publication Data
US 2016/0313554 A1    Oct. 27, 2016

Related U.S. Application Data

(62) Division of application No. 14/167,633, filed on Jan. 29, 2014, now Pat. No. 9,411,157.

(30) Foreign Application Priority Data

Jan. 30, 2013    (JP) ................ 2013-015921

(51) Int. Cl.
*G02B 26/12*    (2006.01)
*G03G 15/04*    (2006.01)
(Continued)

(52) U.S. Cl.
CPC .......... *G02B 26/125* (2013.01); *G02B 7/182* (2013.01); *G03G 15/043* (2013.01);
(Continued)

(58) Field of Classification Search
CPC .... G02B 26/125; G02B 7/182; G02B 26/124; G02B 16/0005
(Continued)

(56) References Cited

U.S. PATENT DOCUMENTS 6,437,817 B1    8/2002 Ohta et al. .................... 347/254
6,661,994 B2    12/2003 Ohuchi et al. ................ 399/400
(Continued)

FOREIGN PATENT DOCUMENTS

JP    H08-44230    2/1996
JP    H08-254912    10/1996
(Continued)

OTHER PUBLICATIONS

Office Action dated Dec. 19, 2017 in counterpart JP Application No. 2017-044176, with translation.

*Primary Examiner* — Ricky Mack
*Assistant Examiner* — Kristina Deherrera
(74) *Attorney, Agent, or Firm* — Fitzpatrick, Cella, Harper & Scinto

(57) ABSTRACT

An optical scanner includes a polygonal mirror; a mirror for reflecting the beam from the polygonal mirror; an optical box having a cap and containing the mirror; a first mirror regulating portion in a direction of a normal line of the mirror, the first regulating portion being provided opposed to such a surface of the reflecting surface and a back surface as is closer to the cap; and a second mirror regulating portion in a beam sub-scanning direction, the second regulating portion being provided opposed to such a surface of the mirror as is closer to the cap; wherein the mirror has a plurality of apex lines, and the first regulating portion and the second regulating portion are disposed at positions which are remoter from the cap than the apex line that is closest to the cap, with respect to a direction perpendicular to a main scan direction.

21 Claims, 12 Drawing Sheets

(51) Int. Cl.
   *G02B 7/182*   (2006.01)
   *G03G 15/043*  (2006.01)
   *H04N 1/00*    (2006.01)
   *H04N 1/06*    (2006.01)
   *H04N 1/113*   (2006.01)

(52) U.S. Cl.
   CPC ... *G03G 15/04072* (2013.01); *H04N 1/00522* (2013.01); *H04N 1/00559* (2013.01); *H04N 1/06* (2013.01); *H04N 1/113* (2013.01); *G02B 26/124* (2013.01); *H04N 2201/0091* (2013.01)

(58) Field of Classification Search
   USPC ............... 359/205.1, 196.1–226.3; 347/257
   See application file for complete search history.

(56) References Cited

U.S. PATENT DOCUMENTS

| | | | |
|---|---|---|---|
| 7,230,638 B2 | 6/2007 | Fukutomi | 347/243 |
| 7,253,935 B2 * | 8/2007 | Kobayashi | G02B 7/008 |
| | | | 347/243 |
| 7,355,771 B2 | 4/2008 | Tomita et al. | 359/205 |
| 7,414,645 B2 * | 8/2008 | Sakai | B41J 2/473 |
| | | | 347/244 |
| 8,160,487 B2 | 4/2012 | Hashimoto | 399/400 |
| 2006/0132881 A1 | 6/2006 | Kim | 359/196 |
| 2013/0176606 A1 | 7/2013 | Jin et al. | G03G 15/043 |

FOREIGN PATENT DOCUMENTS

| | | | |
|---|---|---|---|
| JP | 10-246862 | | 9/1998 |
| JP | 2001-166241 | | 6/2001 |
| JP | 2001-215434 | | 8/2001 |
| JP | 2002-072734 | | 3/2002 |
| JP | 2004-021138 | | 1/2004 |
| JP | 2006-017865 | | 1/2006 |
| JP | 2007-003726 | | 1/2007 |
| JP | 2007-192949 | | 8/2007 |
| JP | 2010-039155 | * | 2/2010 |
| JP | 4728312 B | | 7/2011 |
| JP | 2011-170217 | | 9/2011 |

* cited by examiner

OPTICAL SCANNING DEVICE, AND IMAGE FORMING APPARATUS EQUIPPED WITH THE SAME

CROSS REFERENCE TO RELATED APPLICATIONS

This application is a division of co-pending U.S. patent application Ser. No. 14/167,633 filed Jan. 29, 2014, the contents of which are incorporated by reference herein as if set forth in full; and also claims the benefit of priority under 35 U.S.C. § 119 based on Japanese Patent Application No. 2013-015921 filed Jan. 30, 2013, which is incorporated by reference herein as if set forth in full.

FIELD OF THE INVENTION AND RELATED ART

The present invention relates to an optical scanning device for optically writing an image with the use of a beam of laser light. It relates to also an image forming apparatus, such as a laser beam printer (LBP), a digital copying machine, a digital facsimile machine (FAX), etc., which is equipped with the optical scanning device.

An optical scanning device employed by an image forming apparatus such as a laser beam printer, a digital copying machine, etc., is equipped with a light source unit, and a deflecting device, such as a polygon mirror, which changes a beam of light in direction. It emits a beam of laser light from its light source unit while modulating the beam of laser light with image formation signals, and periodically changes the beam of laser light in direction. It is also equipped with an optical element having the so-called f-θ characteristic. It forms an electrostatic latent image on an object such as a photosensitive drum, by causing the laser beam from its deflecting device, to converge in the form of a spot, on the object. The abovementioned characteristic of an optical element, which is referred to as "f-θ" characteristic, is such a characteristic of an optical element that as a scanning beam of light enters an optical element at an angle θ, the optical element focuses the beam of light in such a manner that the beam of light forms an image, the size of which equals the product of the focal length of the optical element (lens) and the angle θ (f×θ). The light beam deflecting device and optical focusing element are supported by an optical casing (box), the opening of which remains covered with its lid.

Some optical scanning devices have a mirror for deflecting a beam of laser light so that the beam of laser light hits the object, such as a photosensitive drum, to be scanned by the beam of laser light, at a preset angle.

In particular, the mirror which directs the beam of laser light deflected by the optical deflecting device, toward the object to be scanned, is in the form of a rectangular parallelepiped, which is very large in the ratio of its long edge to its short edge. A mirror such as this one is likely to be supported by its lengthwise ends. The optical box has a mirror seating primary surface, by which the mirror is supported by its reflective surface, and a mirror seating secondary surface, by which the mirror is supported by its surface which is perpendicular to its reflective surface. Further, the mirror is stationarily held to the mirror seating primary and secondary surfaces by a regulating member such as a leaf spring.

There is disclosed a regulating member as a means for stationarily holding the mirror, in Japanese Laid-open Patent Application H10-246862. According to this patent application, the mirror is square in cross-section, and its closest edge to the lid of the optical box is kept pressed by the regulating member to keep the mirror pressed upon the mirror seating primary and secondary surfaces of the optical box, which are on the opposite side of optical box from the regulating member.

However, the regulating member disclosed in Japanese Laid-open Patent Application H10-246862 presses on the edge of the mirror, which is on the lid side of the optical box. Therefore, the optical box has to be structured so that the distance between its lid and the mirror is large enough to prevent the lid and regulating member from interfering with each other. Thus, this patent application is likely to increase an optical scanning device in size.

SUMMARY OF THE INVENTION

Thus, the primary object of the present invention is to reduce an optical scanning device in size. Another object of the present invention is to provide the following optical scanning device, or image forming apparatus characterized in that:

According to an aspect of the present invention, there is provided an optical scanning apparatus comprising a light source; a rotatable polygonal mirror for deflecting a beam from said light source; a mirror for reflecting the beam deflected by said rotatable polygonal mirror toward a predetermined surface; an optical box and a closing member mounted to said optical box, wherein said mirror is accommodated in a space defined by said optical box and said closing member; a first regulating portion for regulating a movement of said mirror in a direction of a normal line of a reflecting surface of said mirror, said first regulating portion being provided opposed to such a surface of the reflecting surface of said mirror and a back surface of said mirror as is closer to said closing member; and a second regulating portion for regulating a movement of said mirror in a beam sub-scanning direction of said mirror, said second regulating portion being provided opposed to such a surface of surfaces of said mirror perpendicular to the sub-scanning direction as is closer to said closing member; wherein said mirror has a plurality of apex line, and said first regulating portion and said second regulating portion are disposed at positions which are remoter from said closing member than the apex line that is closest to said closing member, with respect to a direction perpendicular to a main scan direction.

According to another aspect of the present invention, there is provided an optical scanning apparatus comprising a light source; a rotatable polygonal mirror for deflecting a beam from said light source; a mirror for reflecting the beam deflected by said rotatable polygonal mirror toward a predetermined surface; an optical box and a closing member mounted to said optical box, wherein said mirror is accommodated in a space defined by said optical box and said closing member; a first regulating portion for regulating a movement of said mirror in a direction of a normal line of a reflecting surface of said mirror, said first regulating portion being provided opposed to such a surface of the reflecting surface of said mirror and a back surface of said mirror as is closer to said closing member; and a reference portion for positioning said mirror in a beam sub-scan direction of said mirror, said reference portion being provided opposed to such a surface of the reflecting surface of said mirror and a back surface of said mirror as is closer to said closing member; wherein said mirror has a plurality of apex line, and said first regulating portion and said reference portion are disposed at positions which are remoter from said closing member than the apex line that is closest to said closing member, with respect to a direction perpendicular to a main scan direction.

According to a further aspect of the present invention, there is provided an image forming apparatus comprising a light source; a rotatable polygonal mirror, having apex lines for deflecting a beam from said light source; a mirror for reflecting the beam deflected by said rotatable polygonal mirror toward a predetermined surface; an optical box and a closing member mounted to said optical box, wherein said mirror is accommodated in a space defined by said optical box and said closing member; a first regulating portion for regulating a movement of said mirror in a direction of a normal line of a reflecting surface of said mirror, said first regulating portion being provided opposed to such a surface of said mirror closer to said closing member; and a second regulating portion for regulating a movement of said mirror in a beam sub-scanning direction of said mirror, said second regulating portion being provided opposed to such a surface of surfaces of said mirror perpendicular to the sub-scanning direction as is closer to said closing member; wherein said first regulating portion and said second regulating portion are disposed at positions which are remoter from said closing member than the closest apex line said closing member.

According to a further aspect of the present invention, there is provided an image forming apparatus comprising a light source; a rotatable polygonal mirror for deflecting a beam from said light source; a mirror for reflecting the beam deflected by said rotatable polygonal mirror toward a predetermined surface; an optical box and a closing member mounted to said optical box, wherein said mirror is accommodated in a space defined by said optical box and said closing member; a first regulating portion for regulating a movement of said mirror in a direction of a normal line of a reflecting surface of said mirror, said first regulating portion being provided opposed to such a surface of the reflecting surface of said mirror and a back surface of said mirror as is closer to said closing member; and a reference portion for positioning said mirror in a beam sub-scan direction of said mirror, said reference portion being provided opposed to such a surface of the reflecting surface of said mirror and a back surface of said mirror as is closer to said closing member; wherein said mirror has a plurality of apex line, and said first regulating portion and said reference portion are disposed at positions which are remoter from said closing member than the apex line that is closest to said closing member, with respect to a direction perpendicular to a main scan direction, wherein said mirror has a plurality of apex line, and said first regulating portion and said reference portion are disposed at positions which are remoter from said closing member than the apex line that is closest to said closing member, with respect to a direction perpendicular to a main scan direction.

Further features of the present invention will become apparent from the following description of exemplary embodiments (with reference to the attached drawings).

DESCRIPTION OF THE PREFERRED EMBODIMENTS

Hereinafter, the present invention is concretely described with reference to some of the image forming apparatuses equipped with an optical scanning device which is in accordance with the present invention.

Embodiment 1

Figure 1:
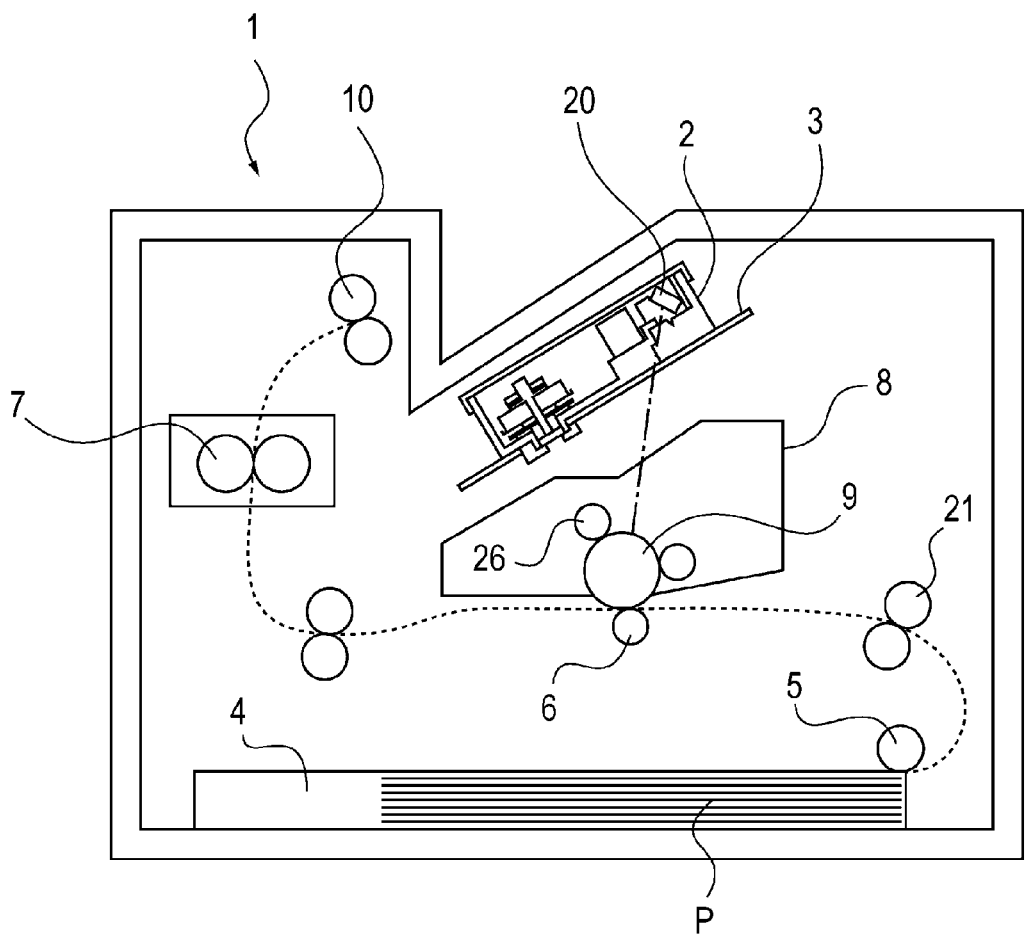
FIG. 1 is a sectional view of an image forming apparatus equipped with an optical scanning device in accordance with the present invention, and shows the structure of the apparatus.

To begin with, referring to FIGS. 1-4, the image forming apparatus in the first embodiment of the present invention, which is equipped with an optical scanning device which is in accordance with the present invention is described about its structure. FIG. 1 is a drawing which shows the structure of the image forming apparatus 1 in this embodiment of the present invention. Referring to FIG. 1, an optical scanning device 2 is on a holder 3, which is a part of the casing of the image forming apparatus 1.

The image forming apparatus 1 has: a sheet feeding/conveying portion 4, in which multiple sheets P of recording medium are storable; a sheet feeder roller 5; a transfer roller as a transferring means; and a fixing device 7 as a fixing means. Further, the image forming apparatus 1 is provided with a process cartridge bay, in which a process cartridge 8 (as image forming means) is disposed so that it opposes the transfer roller 6, with the presence of the recording medium conveyance passage between the cartridge 8 and transfer roller 6.

The process cartridge 8 has a photosensitive drum 9 (as image bearing member). The sheets P of recording medium in the sheet feeding/conveying portion 4 are fed one by one into the main assembly of the image forming apparatus 1, while being separated from the rest of the sheets P in the sheet feeding/conveying portion 4 by the combination of the sheet feeder roller 5 and an unshown separating means. Then, each sheet P of recording medium is conveyed by a pair of registration rollers 21 to the nip between the photosensitive drum 9 and transfer roller 6, with such a timing that the arrival of each sheet P at the nip synchronizes with the arrival of the toner image on the peripheral surface of the photosensitive drum 9 at the nip. Then, the toner image on the peripheral surface of the photosensitive drum 9 is transferred onto the sheet P by the transfer roller 6.

After the transfer of the toner image onto the sheet P of recording medium, the sheet P is conveyed to the fixing device 7, in which the toner image on the sheet P is fixed to the sheet P by heat and pressure. Then, the sheet P, which has the fixed toner image, is discharged from the image forming apparatus 1 by a pair of discharge rollers 10.

Figure 2:
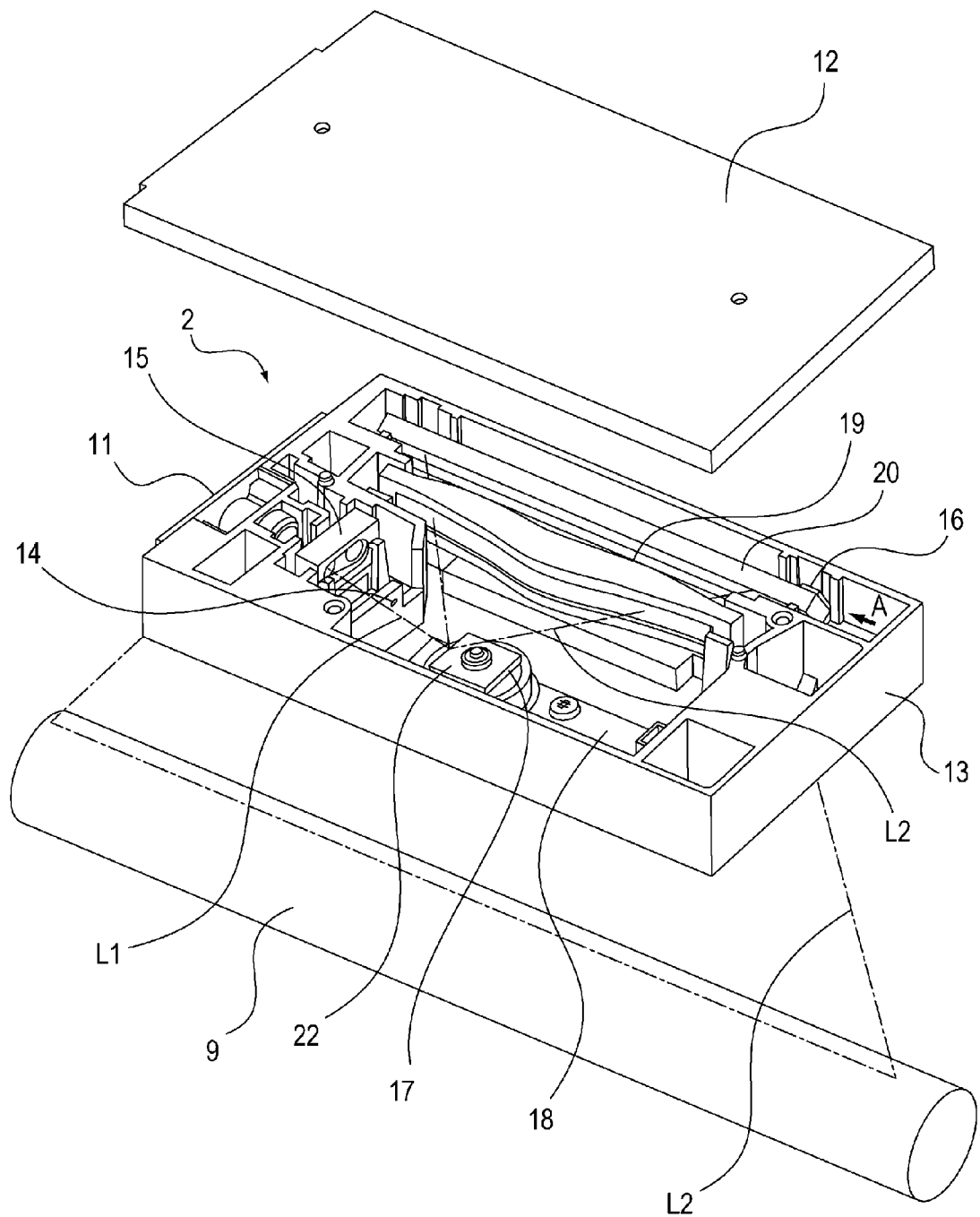
FIG. 2 is a perspective view of the optical scanning device in the first embodiment of the present invention, and shows the structure of the device.

FIG. 2 is a partially exploded perspective view of the optical scanning device 2 in this embodiment. It shows the structure of the device 2. Referring to FIG. 2, the beam L1 of laser light emitted from the light source unit 11 (as light source) is made to converge by the cylindrical lens 15 only in the secondary scanning direction. Then, the converged beam L1 of laser light is limited in diameter to a preset value by the optical iris with which the optical box 13 formed of black resin is provided. Then, the beam L1 of laser light is made to linearly converge on the reflective surface 17 of the rotational polygon mirror 22 for deflecting the beam of light which comes from the light source unit 11.

The secondary scan direction of the beam of light means such direction that corresponds to the rotational direction of the photosensitive drum 9 (direction in which sheet P is conveyed). The primary scan direction of the beam of light is such direction that corresponds to the direction of the axial line of the photosensitive drum 9 (direction perpendicular to direction in which sheet P is conveyed).

The rotational polygon mirror 22 is rotationally driven by a driving means such as a motor with which the light deflecting device 18 is provided. That is, the rotational polygon mirror 22 is rotated with the driving means such as a motor with which the light deflecting device 18 is provided. The rotational polygon mirror 22 deflects the beam L1 of laser light as the beam L1 emitted from the light source unit 11 is projected upon the rotational polygon mirror 22 through the cylindrical lens 15 and optical iris 14. The light deflecting device 18 deflects the beam L1 in such a manner that as the beam L1 is deflected by the rotational polygon mirror 22, the beam L1 scans the peripheral surface of the photosensitive drum 9.

Figure 3:
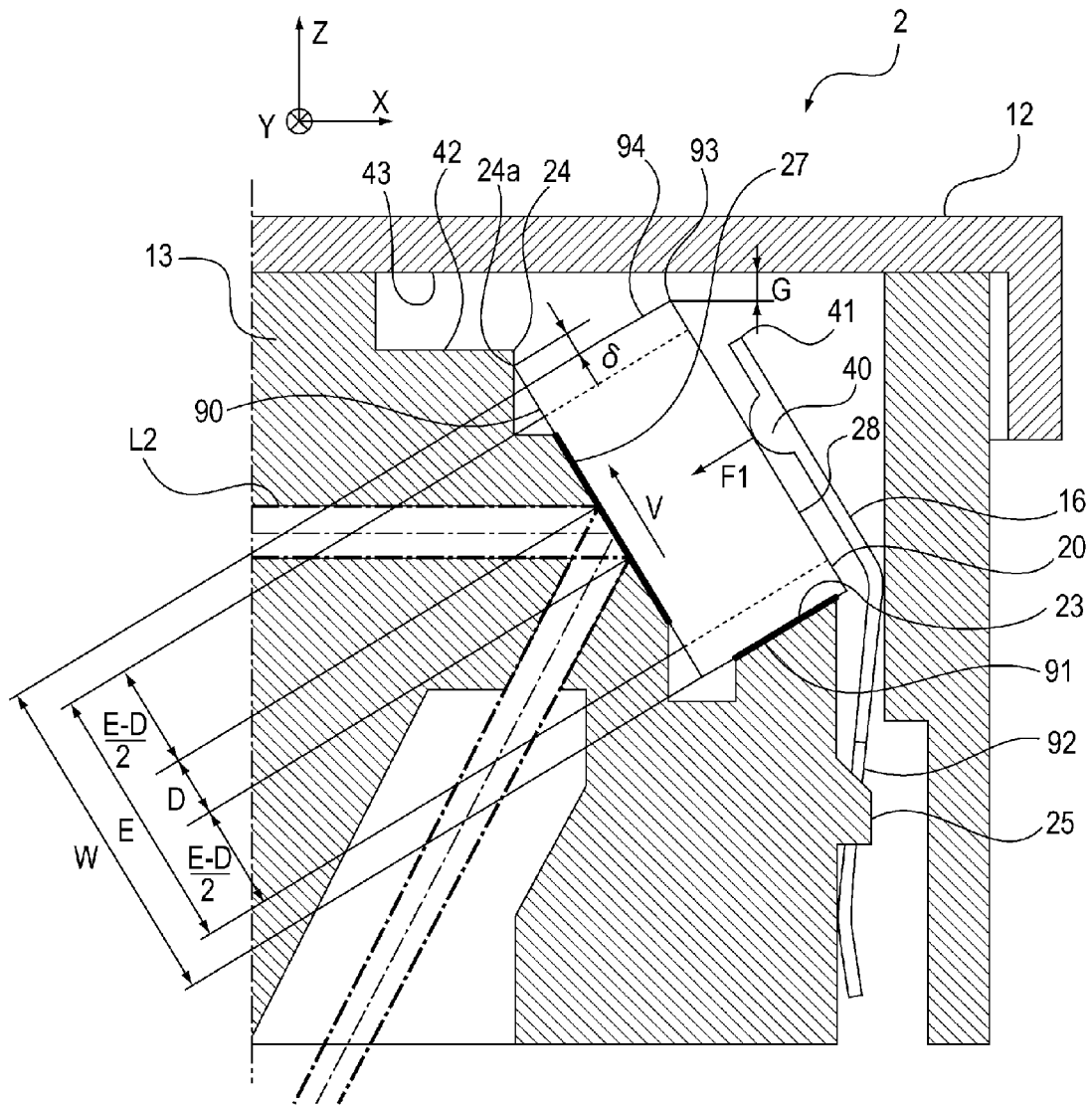
FIG. 3 is a sectional view of the optical scanning device in the first embodiment, and shows the structure of the mirror, and its adjacencies, of the device.

The beam L2 of laser light, which is the beam L1 of laser light deflected by the rotational polygon mirror 22 rotated by the deflecting device 18, passes through the f-θ lens, which functions as the focusing lens for making the beam of laser light converge. The f-θ lens is characterized in that as the beam L2 of laser light enters the f-θ lens at an angle θ, the beam L2 is focused into an image, the size of which is equal to the value of the product between the focal distance f of the f-θ lens and the angle θ. Referring to FIG. 3, as the beam L2 of laser light passes through the f-θ lens, it is reflected by the reflective surface 90 of the long and narrow mirror 20, which is for reflecting the beam of laser light deflected by the rotational polygon mirror 22, toward the preset surface. Then, the beam L2 of laser light is made to converge on the peripheral surface of the photosensitive drum 9, while being moved in a manner of scanning the peripheral surface of photosensitive drum 9, as shown in FIG. 1, forming thereby an electrostatic latent image on the peripheral surface of the photosensitive drum 9. The light source unit 11, cylindrical lens 15, optical iris 14, rotational polygon mirror 22, light deflecting device 18, f-θ lens 19, and mirror 22 are disposed within the optical box 13, and are supported by the box 13. The top opening of the optical box 13 is covered with a lid 12 made of resin or metallic plate. That is, the interior of the optical box 13, in which the various optical members (light source unit 11, cylindrical lens 15, optical iris 14, rotational polygon mirror 22, light directing device 18, f-θ lens 19, and mirror 22) are disposed, is covered by the lid 12 attached to the optical box 13. That is, the optical box 13 and its lid 12 are equivalent to the first and second members which make up the housing in which the various optical members are disposed.

FIG. 3 is a sectional view of the mirror 20, and its adjacencies (to which mirror 20 is fixed), of the optical scanning device 2 in this embodiment, as seen from the lengthwise end of the mirror 20, in the direction indicated by an arrow mark A in FIG. 2. It shows the structure of the mirror 20 and its adjacencies (to which mirror 20 is fixed).

The optical box 13 has the mirror seating primary surface 27 (which is parallel to the reflective surface 90 of the mirror 20) and mirror seating secondary surface 23 (which hereafter may be referred to simply as primary and secondary seating surfaces 27 and 23, respectively). The primary seating surface 27 is an integral part of the internal surface of the optical box 13. The secondary seating surface 23 is perpendicular to the primary seating surface 27. It also is an integral part of the internal surface of the optical box 13.

The reflective surface 90 of the mirror 20 is in contact with the primary seating surface 27. The bottom surface 91 of the mirror 20, which is perpendicular to the reflective surface 90, is in contact with the secondary seating surface 23. The leaf spring 16 which is the primary regulating means (first regulating means) for regulating the mirror 20 in the normal direction (opposite direction from direction indicated by arrow mark F1 in FIG. 4) of the reflective surface 90 is provided with a pressing portion 40, which applies a force F1 to the mirror 20 to keep the mirror 20 pressed upon the primary seating surface 27. The optical scanning device 2 is structured so that the pressing portion 40 of the leaf spring 16 faces the opposite surface 28 of the mirror 20 from the reflective surface 90 of the mirror 20, and also, is placed in contact with the surface 28. This is the structural arrangement of the optical scanning device 2, by which the mirror 20 is supported by the optical box 13.

The leaf spring 16 is provided with a hole 92, into which the spring anchoring portion 25 (protrusive portion) of the optical box 13 is fitted to keep the leaf spring 16 fixed to the optical box 13. In terms of the direction parallel to the axis Z (upward direction) in FIG. 3, the edge 41 of the lengthwise end of the leaf spring 16, which is closer to the lid 12, is not protrusive upward beyond the edge 93 of the mirror 20, which is the closest portion of the mirror 20 to the lid 12. The direction parallel to the axis Z is such direction that is parallel to the rotational axis of the rotational polygon mirror 22.

Figure 4:
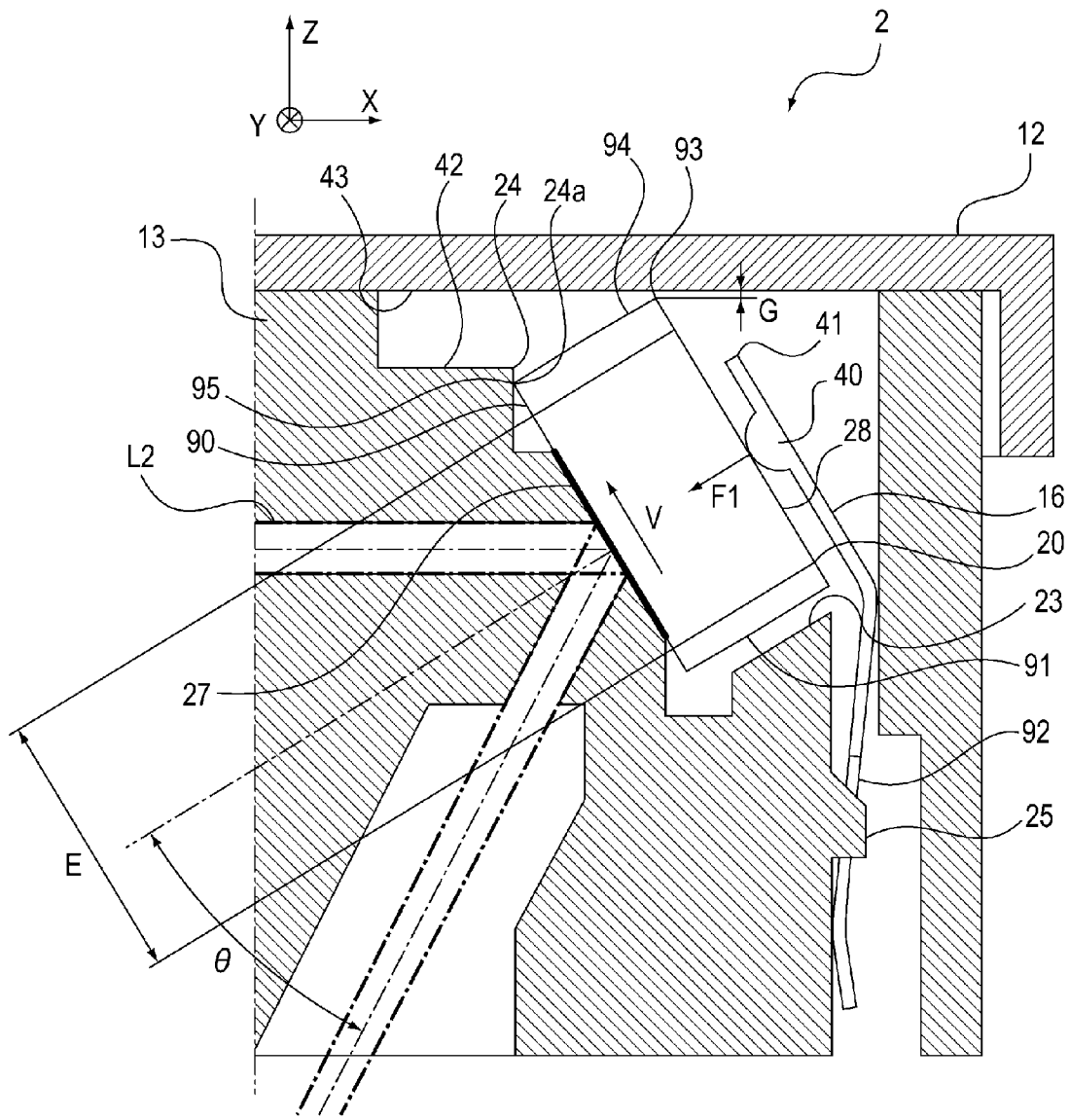
FIG. 4 also is a sectional view of the optical scanning device in the first embodiment, and shows the structure of the mirror, and its adjacencies, of the device.

The stopper 24 is an integral part of the internal surface of the optical box 13, and functions as the secondary regulating member (second regulating member) which regulates the mirror 20 in the movement in terms of the secondary scan direction (indicated by arrow mark V in FIG. 3) of the beam of the laser light. The optical box 13 is structured so that the stopper 24 faces the top surface 94 of the mirror 20, which is closer to the lid 12 in terms of the secondary scan direction (indicated by arrow mark V in FIG. 3) than the bottom surface of the mirror 91. Thus, the edge 95 of the mirror 20 remains in contact with the area of contact 24a of the stopper 24, preventing thereby the mirror 20 from shifting in the direction parallel to the axis Z (upward direction in FIG. 4) as shown in FIG. 4.

In terms of the direction indicated by the arrow mark V, the stopper 24 is between the lid 12 and mirror 20. In terms of the direction perpendicular to the reflective surface 90 (direction perpendicular to direction indicated by arrow mark V in FIG. 4), the stopper 24 overlaps with the mirror 20 at least partially.

In terms of the direction parallel to the axis Z, the top surface 42 of the stopper 24 is positioned farther from the inward surface 43 of the lid 12 than the edge 93 of the mirror 20, which is the closest of the four edges of the mirror 20 which extend in the primary scan direction (parallel to axis Y), to the lid 12.

Also in terms of the direction parallel to the axis Z, the edge 41 of the leaf spring 16 (primary regulating member), which is closest to the lid 12, of the edges of the leaf spring 16, is positioned farther from the inward surface 43 of the lid 12, than the edge 93 of the mirror 20.

Therefore, in terms of the direction parallel to the axis Z (upward in FIG. 3), neither the edge 41 of the lengthwise top end of the leaf spring 16 (as primary regulating member), nor the top surface 42 of the stopper 24, are above the edge 93 of the mirror 20, which is the closest portion of the mirror 20 to the lid 12.

Referring to FIG. 3, in terms of the secondary scan direction (indicated by arrow mark V in FIG. 3) of the beam of laser light, there is provided a gap δ between the top surface 94 of the mirror 20, which is the closest of the surfaces of the mirror 20, to the lid 12, and the stopper 24 (as secondary regulating member).

Referring also to FIG. 3, a letter W stands for the length of the reflective surface 90 of the mirror 20, in terms of the secondary scan direction (indicated by arrow mark V in FIG. 3) of the bean of laser light, and a letter E stands for the effective reflective range of the reflective surface 90, in terms of the secondary scan direction. Further, a letter D stands for the diameter of the beam L2 of the laser beam at the reflective surface 90 of the mirror 20, in terms of the secondary scan direction of the beam of the laser light. In this embodiment, the optical scanning device 2 is structured so that the distance δ of the above described gap is set so that the following mathematical formula is satisfied:

$$\delta < (E-D)/2 \quad (1).$$

FIG. 4 shows the state of the optical scanning device 2, in which the mirror 20 which was in the position shown in FIG. 3 has moved in the secondary scan direction of the beam of laser light indicated by the arrow mark V in FIG. 4, and the edge 95 of the mirror 20 has come into contact with the stopper 24. In the normal usage, the mirror 20 is prevented by the friction between the reflective surface 90 of the mirror 20 and the primary seating surface 27 which is a part of the internal surface of the optical box 13, from moving in the secondary scan direction of the beam of laser light indicated by the arrow mark V in FIG. 4.

However, the top surface 94 of the mirror 20 is not under the pressure generated by the pressure applying means such as a spring. Therefore, if the optical scanning device 2 is subjected to an excessive amount of impact, it is possible that the mirror 20 will moves in the direction indicated by the arrow mark V in FIG. 4.

In this embodiment, even if the mirror 20 moves in the direction indicated by the arrow mark V in FIG. 4, the maximum distance by which the mirror 20 is allowed to move is the distance δ of the gap. Therefore, as long as the distance δ of the gap satisfies the mathematical equation (1), it does not occur that the beam L2 misses the effective reflective range E of the reflective surface 90 of the mirror 20. Further, even if the mirror 20 moves in the direction indicated by the arrow mark V in FIG. 4, the angle θ of reflection of the laser beam L2 at the reflective surface 90 of the mirror 20 does not change. Therefore, it does not occur that the beam L2 misses the preset point on the peripheral surface of the photosensitive drum 9 in terms of the secondary scan direction.

Also referring to FIG. 4, when the edge 95 of the mirror 20 is in contact with the stopper 24, there is the gap G, which is roughly several millimeters wide, between the closest edge 93 of the mirror 20 to the lid 12 and the inward surface 43 of the lid 12. Therefore, it does not occur that the mirror 20 comes into contact with the lid 12.

Further, the optical scanning device 2 is structured so that, in terms of the direction parallel to the axis Z, the top surface 42 of the stopper 24 is positioned farther from the inward surface 43 of the lid 12 than the edge 93 of the mirror 20, which is the closest to the lid 12, of the four edges of the mirror 20 which extend in the primary scan direction (parallel to axis Y). Further, the optical scanning device 2 is structured so that, in terms of the direction parallel to the axis Z, the closest edge 41 of the leaf spring 16 (as primary regulating member) to the lid 12 is positioned farther from inward surface 43 of the lid 12 than the edge 93 of the mirror 20.

Therefore, it is possible to position the inward surface of the lid 12 infinitesimally close to the edge 93 of the mirror 20, which is the closest portion of the mirror 20 to the lid 12 in terms of the direction parallel to the axis Z, as shown in FIG. 4.

In other words, it is possible to reduce the optical scanning device 2 in its dimension in terms of the direction parallel to the axis Z (upward direction in FIG. 4) which is parallel to the rotational axis of the rotational polygon mirror 22 shown in FIG. 4, and therefore, it is possible to reduce the image forming apparatus 1 in size and thickness. Further, the leaf spring 16 (as primary regulating member) presses the mirror 20 only in the direction (indicated by arrow mark F1 in FIG. 4) which is perpendicular to the mirror seating primary surface 27, to regulate the mirror 20 in movement. As for the regulation of the movement of the mirror 20 in the direction (opposite from direction indicated by arrow mark V in FIG. 4) perpendicular to the mirror seating secondary surface 23, the stopper 24 with which the optical box 13 is provided functions as the regulating portion.

Therefore, this embodiment allows the leaf spring 16 to reduce in size, and therefore, can reduce the leaf spring 16 in cost. In addition, the leaf spring 16 is not required to press the mirror 20 upon both the mirror sealing primary surface 27 and mirror sealing secondary surface 23. Therefore, the leaf spring 16 may be very simply in shape and structure. Thus, this embodiment can improve an optical scanning device (2) in quality.

In this embodiment, the optical scanning device 2 is structured so that the distance between the lid 12 and edge 93 is minimized in terms of the direction parallel to the axis Z. However, this embodiment is not intended to limit the present invention in terms of the structure of the optical scanning device 2. That is, all that is required of an optical scanning device by the present invention is that, in terms of the primary scan direction (parallel to axis Y), the stopper 24 is positioned farther from the inward surface 43 of the lid 12, than the edge 93 of the mirror 20, that is, the closest of the four edges of the mirror 20 (which extend in the primary scan direction) to the lid 12, and also, that the closest edge portion 41 of the leaf spring 16 (as primary regulating member) to the inward surface 42 of the lid 12 is positioned farther from the edge 93 of the mirror 20 in terms of the preset direction.

As described above, in this embodiment, the optical scanning device 2 is structured so that in terms of the preset direction which is perpendicular to the primary scan direction (parallel to axis Y), the edge 92 of the mirror 20 is positioned closest to the lid 12. Thus, this embodiment can reduce an optical scanning device (2), and an image forming apparatus (a), in dimension in terms of a preset direction which is perpendicular to the primary scan direction (parallel to axis Y) of the optical scanning device (2).

Embodiment 2

Figure 5:
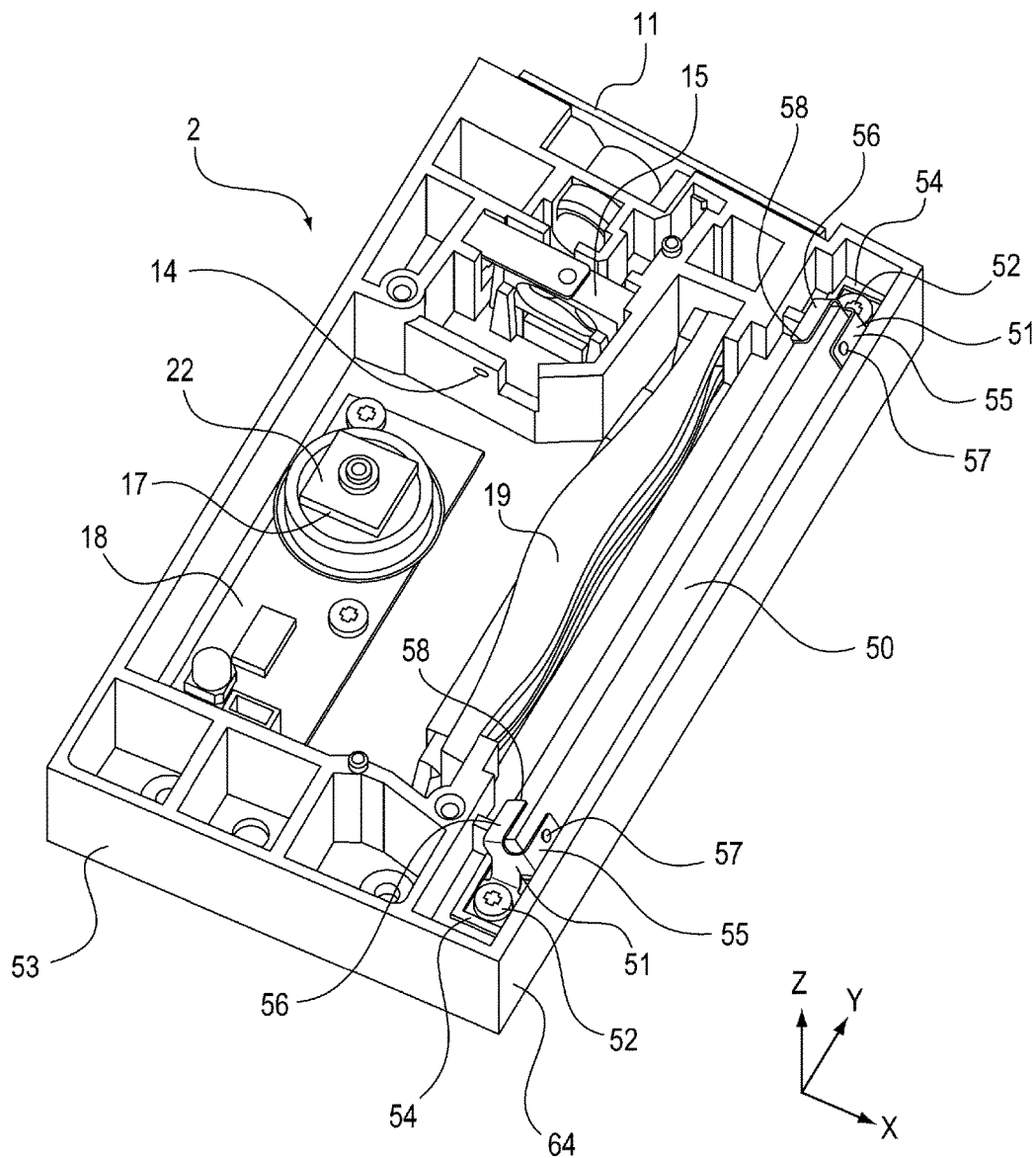
FIG. 5 is a perspective view of the optical scanning device in the second embodiment of the present invention, and shows the structure of the device.
Figure 6:
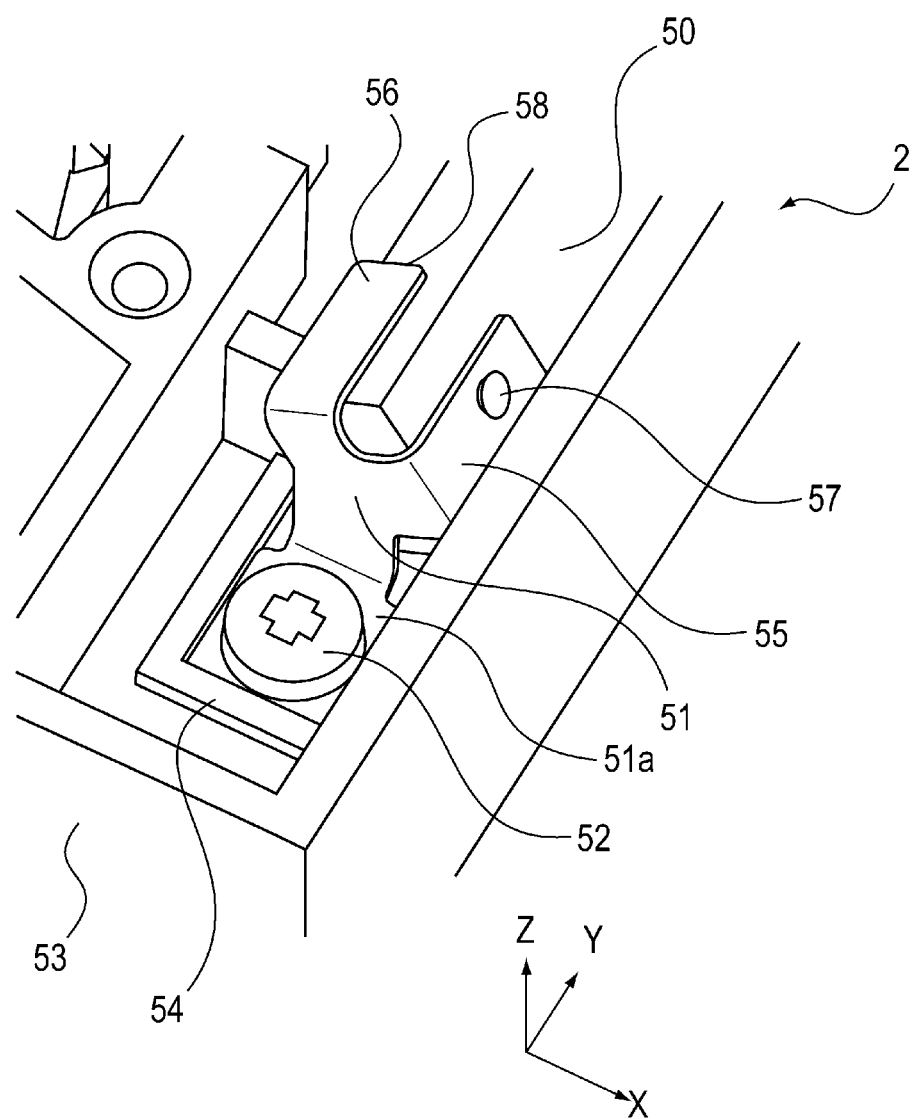
FIG. 6 is a perspective view of the optical scanning device in the second embodiment, and shows the structure of the device, in particular, the structure of the primary and secondary regulating members positioned at the lengthwise ends of the mirror, one for one.
Figure 7:
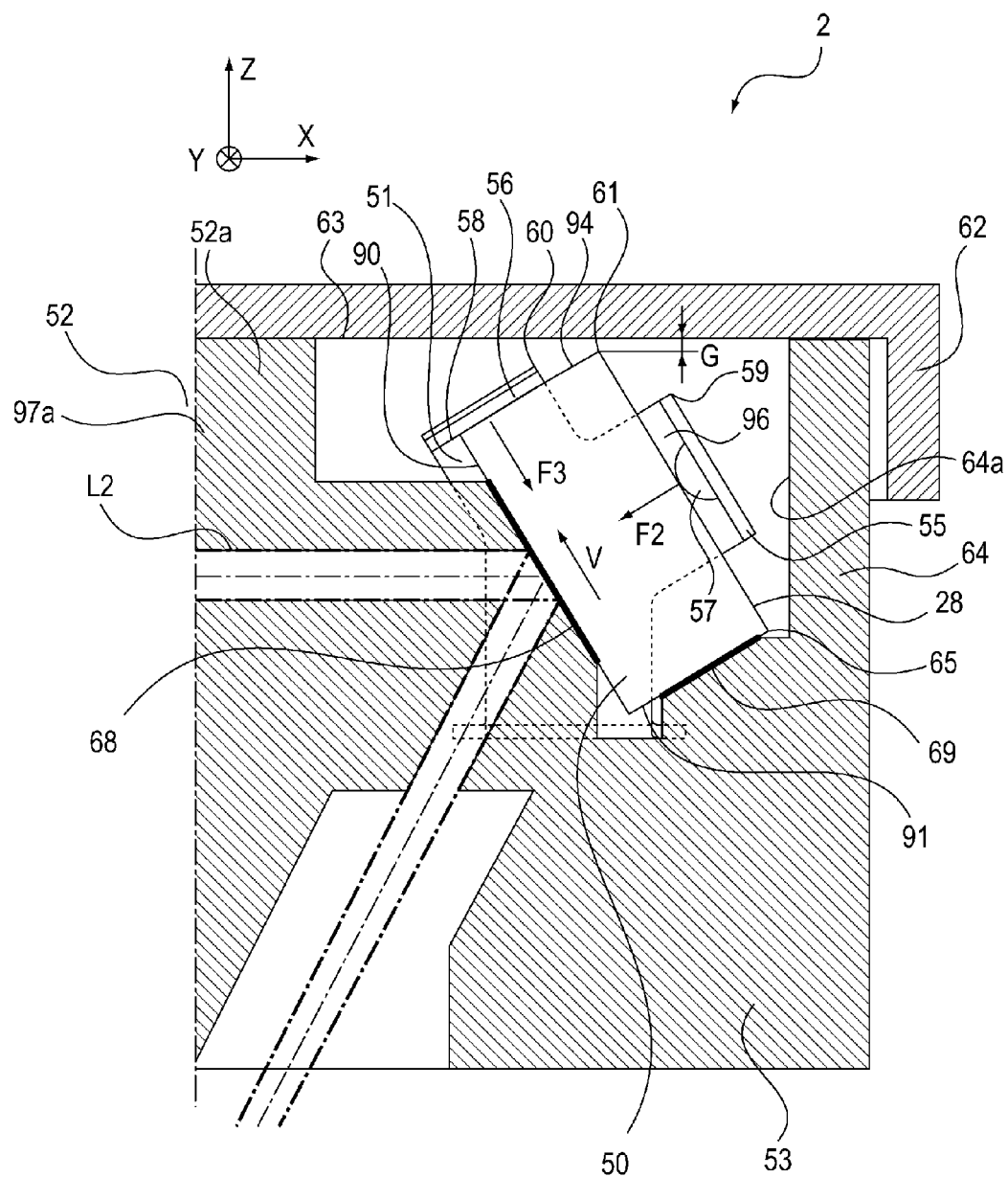
FIG. 7 is a perspective view of the optical scanning device in the second embodiment, and shows the structure of the device, in particular, the structure of the mirror and its adjacencies.

Next, referring to FIGS. 5-7, the optical scanning device 2 in the second embodiment of the present invention is described about its structure, with reference to the image forming apparatus equipped with the optical scanning device. The components of the optical scanning device 2 and the components of the image forming apparatus, which are similar in structure to the counterparts in the first embodiment are given the same referential codes, one for one, and are not described. Further, even if a given component of the optical scanning device 2 or image forming apparatus is given a referential code which is different from the one given to the counterpart in the first embodiment, it is not described here as long as it is similar in structure to the counterpart.

FIG. 5 is a perspective view of the optical scanning device 2 in this embodiment, minus its lid. FIG. 6 is a perspective view of the mirror 50, and its adjacencies, of the optical scanning device 2. It shows the structure of the mirror 50 and its adjacencies, in particular, the portion of the device 2, to which the mirror 20 of the device 2 is attached. FIG. 7 is a partial sectional view of the mirror 50, and its adjacencies, of the optical scanning device 2. It shows the mirror 50 and its adjacencies, in particular, the portion of the device 2, to which the mirror 50 is attached.

The mirror 50 which deflects the beam of laser light deflected by the rotational polygon mirror 22, toward the preset surface, is fixed to the optical box 53 with the use of a leaf spring 51 having a pair of elastic portions 55 and 56. More specifically, the leaf spring 51 has the elastic portion 55 (as primary regulating portion) for regulating the mirror 50 in the movement in the direction (indicated by arrow mark F2 in FIG. 2) perpendicular to the reflective surface 90 of the mirror 50. Further, the leaf spring 51 has the elastic portion 56 (as secondary regulating portion) for regulating the mirror 50 in the movement in the secondary scan direction (indicated by arrow mark V in FIG. 7) of the beam of laser light.

Also in this embodiment, the elastic portion 55 (as primary regulating portion) is positioned so that it faces the surface 28 of the mirror 50, which is the opposite surface of the mirror 50 from the reflective surface 90 of the mirror 50 and is closer to the lid 62 of the optical box 64. As for the elastic portion 56 (as secondary regulating portion), it is in contact with the top surface 94 of the mirror 50, which is closer to the lid 62 in terms of the secondary scan direction (indicated by arrow mark V in FIG. 7) of the beam of laser light, than the opposite surface of the mirror 50 from the surface 94.

Also in this embodiment, the optical scanning device 2 is structured so that the elastic portion 55 (as primary regulating portion) is positioned farther from the inward surface of the lid 62, than the edge 61 of the mirror 50, which is closest to the lid 62, of the four edges of the mirror 50 which extend in the secondary scan direction (indicated by arrow mark V in FIG. 7). Further, the elastic portion 56 (as secondary regulating portion) also is disposed farther from the inward surface 63 of the lid 62 than the edge 61.

Each of the elastic portions 55 and 56 (as primary and secondary regulating portions, respectively) is a piece of long and narrow plate formed of an elastic substance. They extend from the outward side of the lengthwise end of the mirror 50 toward the lengthwise center of the mirror 50 as shown in FIG. 6.

Referring to FIG. 6, the leaf spring 51 having the elastic portions 55 and 56 is fixed to the optical box 53 with the use of a small screw 52. The optical scanning device 2 is structured so that after the fixation of the leaf spring 51 to the optical box 53, the base portion of the leaf spring 51, by which the leaf spring 51 is fixed to the optical box 53, will be on the outward side of the mirror 50 in terms of the lengthwise direction of the mirror 50. The portion of the bottom wall of the optical box 53, to which the square base portion 51a of the leaf spring 51 is fixed, is provided with a roughly U-shaped edge 54 (in top view), which surrounds the square base portion 51a of the leaf spring 51 as the leaf spring 51 is fixed to the bottom wall of the optical box 53. That is, the square base portion 51a of the leaf spring 51 is fitted into the area surrounded by the U-shaped protrusion 54, and then, is fixed to the bottom wall of the optical box with the use of the small screw 51. The U-shaped protrusion 54 prevents the problem that as the small screw 52 is rotated to be tightened to fix the leaf spring 51 to the optical box 53, the leaf spring 51 is rotated by the rotation of the small screw 52.

Also referring to FIG. 6, the leaf spring 51 is bifurcate. That is, it has two elastic portions 55 and 56. The surface 28 of the elastic portion 55, which faces the mirror 50, is provided with a mirror pressing portion 57, which was formed by embossing. Next, referring to FIG. 7, the pressing portion 57 applies a force F2 to the mirror 50 to keep the mirror 50 pressed upon the primary seating surface 68, which is an integral part of the internal surface of one of the walls of the optical box 53.

A pressing portion 58, which is one of the edges of the elastic portion 56, applies a force F3 to the mirror 50 to keep the mirror 50 pressed upon the secondary seating surface 69, which is an integral part of the inward surfaces of the optical box 53. Referring to FIG. 7, the edge 59 of the elastic portion 55, which is the closest portion of the elastic portion 55, to the lid 62, in terms of the direction (upward direction in FIG. 7) parallel to the axis Z, and the edge 60 of the elastic portion 56, which is the closest portion of the elastic portion 56, to the lid 62, in terms of the direction (upward direction in FIG. 7) parallel to the axis Z, do not protrude beyond the edge 61 of the mirror 50, which is the closest portion of the mirror 50 to the lid 62.

Thus, like the first embodiment, this embodiment also makes it possible to position the lid 62 infinitesimally close to the edge 61 of the mirror 50, which is the closest portion of the mirror 50 to the lid 62. Further, in this embodiment, the mirror 50 remains pressed upon the secondary seating surface 69 by the pressing portion 58. Therefore, it does not occur that the mirror 50 is moved in the direction indicated by the arrow mark V in FIG. 7, by impact. Thus, this embodiment can further reduce an optical scanning device in the gap G between the inward surface 63 of the lid 62, and the edge 61 of the mirror 50, which is closest portion of the mirror 50 to the lid 62, than the first embodiment.

Further, referring to FIG. 5, the optical scanning device 2 is provided with the pair of leaf springs 51, which are disposed at both lengthwise ends of the mirror 50, one for one. Further, referring to FIGS. 6 and 7, the elastic portion 55 (as primary regulating portion) extends in parallel to the lengthwise direction (parallel to axis Y in FIG. 7) which is parallel to the primary scan direction.

Therefore, this embodiment makes it possible to position the inward surface 64a of the external wall 64 of the optical box 13, infinitesimally close to the edge 65 of the mirror 50, which is the closest portion of the mirror 50 to the external wall 64, in terms of the direction parallel to the axis X. Thus, this embodiment makes it possible to reduce an optical scanning device (2) in dimension in terms of the direction parallel to the axis X in FIG. 7 (left-right direction in FIG. 7). Otherwise, the optical scanning device 2 in this embodiment is the same in structure as the one in the first embodiment. Further, this embodiment can provide the same effects as the first embodiment.

Embodiment 3

Figure 8:
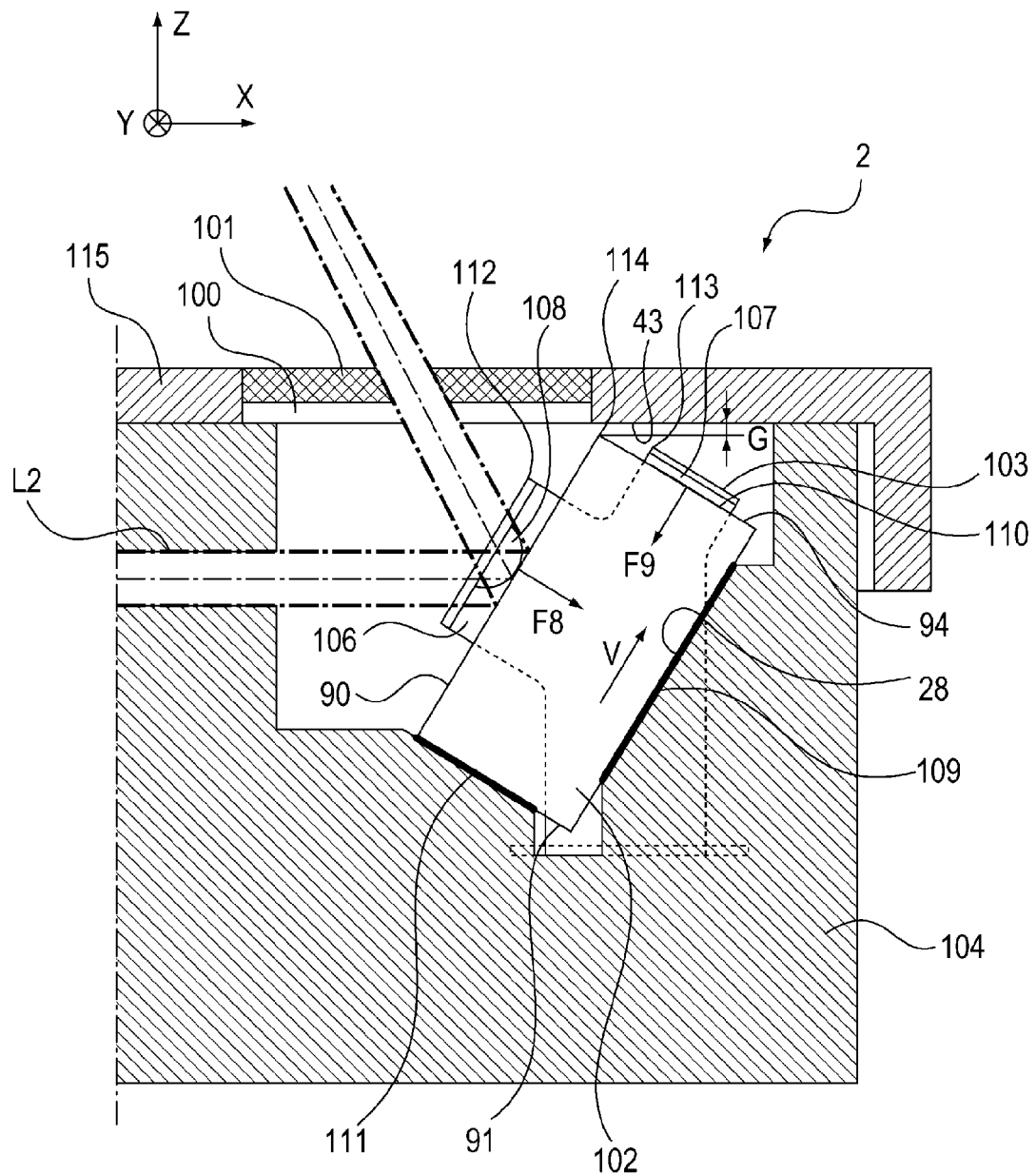
FIG. 8 is a sectional view of the optical scanning device in the third embodiment of the present invention, and shows the structure of the device.

Next, referring to FIG. 8, the optical scanning device in the third embodiment of the present invention is described about its structure. The components of the optical scanning device in this embodiment, which are the same in structure as the counterparts in the preceding embodiments are given the same referential codes as those given to the counterparts, one for one, and are not described. Further, even if a given component of the optical scanning device in this embodiment is given a referential code which is different from the one given to the counterpart in the first embodiment, it is not described as long the given component is same in structure as the counterpart in the preceding embodiments.

This embodiment is a modification of the second embodiment. In the case of the optical scanning device in the second embodiment, which is shown in FIG. 7, the beam L2 of laser light (beam of light) is reflected by the mirror 50 toward the bottom surface of the optical box 53, which is on the opposite side of the optical box 50 from the lid 62 of the box 50. Further, the photosensitive drum 9, on the peripheral surface of which an electrostatic image is formed, is below the optical scanning device 2.

Referring to FIG. 8, in this embodiment, the beam L2 of laser light (beam of light) is reflected by the reflective surface 90 of the mirror 102 toward the lid 115, passes through the window 100, with which the lid 115 is provided. Then, it forms an electrostatic latent image on the peripheral surface of the photosensitive drum 9 disposed above the optical scanning device 2.

Referring again to FIG. 8, the lid 115 in this embodiment is provided with a dust cover 101, which is formed of transparent glass and covers the window 100.

The mirror 102, which reflects the beam of laser light deflected by the rotational polygon mirror 22, is fixed to the optical box 104 with the use of a leaf spring 103 having a pair of elastic portions 106 and 107. More specifically, the leaf spring 103 has the elastic portion 106 (as primary regulating portion) which regulates the mirror 120 in the movement in the primary scan direction (opposite direction from direction indicated by arrow mark F8 in FIG. 8) which is perpendicular to the reflective surface 90 of the mirror 102. The leaf spring 103 has also the elastic portion 106 (as secondary regulating portion) which regulates the mirror 102 in the movement in the secondary scan direction (indicated by arrow mark V in FIG. 8).

In this embodiment, the optical scanning device 2 is structured so that the elastic portion 106 (as primary regulating member) faces the reflective surface 90 of the mirror 102, which is closer to the lid 115 than the opposite surface 28 of the mirror 102 from the reflective surface 90, and also, so that the elastic portion 107 (as secondary regulating portion) is placed in contact with the top surface 94 of the mirror 102, which is closer to the lid 115 in terms of the primary scan direction (indicated by arrow mark V in FIG. 8) than the opposite surface of the mirror 102 from the top surface 94.

The elastic portion 106 (as primary regulating portion) is positioned farther from the inside wall 43 of the lid 115 than the edge 114 of the mirror 102, which is closest to the lid 115, of the four lengthwise edges of the mirror 102, which extend in the secondary scan direction (indicated by arrow mark V in FIG. 8) of the beam of light. Further, the elastic portion 107 (as secondary regulating member) is positioned farther from the inward surface 43 of the lid 115 than the edge 114.

Also in this embodiment, the elastic portion 106 (as primary regulating portion), and the elastic portion 107 (as secondary regulating portion), are long and narrow. Referring to FIG. 8, the elastic portions 106 and 107 extend from the outward side of the mirror 102 toward the center of the mirror 102, in terms of the lengthwise direction of the mirror 102.

The leaf spring 103 having the elastic portions 106 and 107 which are integral parts of the leaf spring 103 is fixed to the optical box 104 with the use of the small screw 52 shown in FIG. 6, like the leaf spring 51 in the above described second embodiment. That is, the portion of the leaf spring 103, by which the leaf spring 103 is fixed to the optical box 104 with the use of the small screw 52, is on the outward side of the mirror 102 in terms of the lengthwise direction of the mirror 102. The inward surface of the bottom wall of the optical box 104 is provided with a protrusive portion 54, which is roughly U-shaped (in top view). The square base portion 51a of the leaf spring 103, by which the leaf spring 103 is fixed to the optical box 104, is placed on the bottom surface of the optical box 104 in such a manner that it fits into the area surrounded by the protrusive portion 54, whereby it is prevented that when the small screw 52 is rotated to be tightened, the leaf spring 103 is rotationally moved by the rotation of the small screw 52.

Referring to FIG. 8, the leaf spring 103 also is bifurcated, having two prongs, that is, the elastic portions 106 and 107. The elastic portion 106 is provided with a mirror pressing portion 108 which is on the surface of the elastic portion 106, which faces the reflective surface 90 of the mirror 102. The pressing portion 108 is formed by embossing. The pressing portion 108 applies a force F8 to the mirror 102 to keep the mirror 102 pressed upon the primary seating surface 109, which is an integral part of the inward surface of the optical box 104.

A mirror pressing portion 110, which is one of the edges of the elastic portion 107, applies a force F9 to the mirror 102 to keep the mirror 102 pressed upon the secondary seating surface 111, which is an integral part of the internal surface of the optical box 104. Referring to FIG. 8, the edge 112 of the elastic portion 106, which is the closest portion of the elastic portion 106 to the lid 115, and the edge 113 of the elastic portion 107, which is the closest portion of the elastic portion 107 to the lid 115, are not protrusive upward beyond the edge 114 of the mirror 102, which is the closest portion of the mirror 102 to the lid 115, in terms of the direction parallel to axis Z (upward in FIG. 8). Otherwise, the optical scanning device 2 in this embodiment is the same in structure as the optical scanning device 2 in the preceding embodiments, and the effects of this embodiment are the same as those of the preceding embodiments.

Embodiment 4

Figure 9:
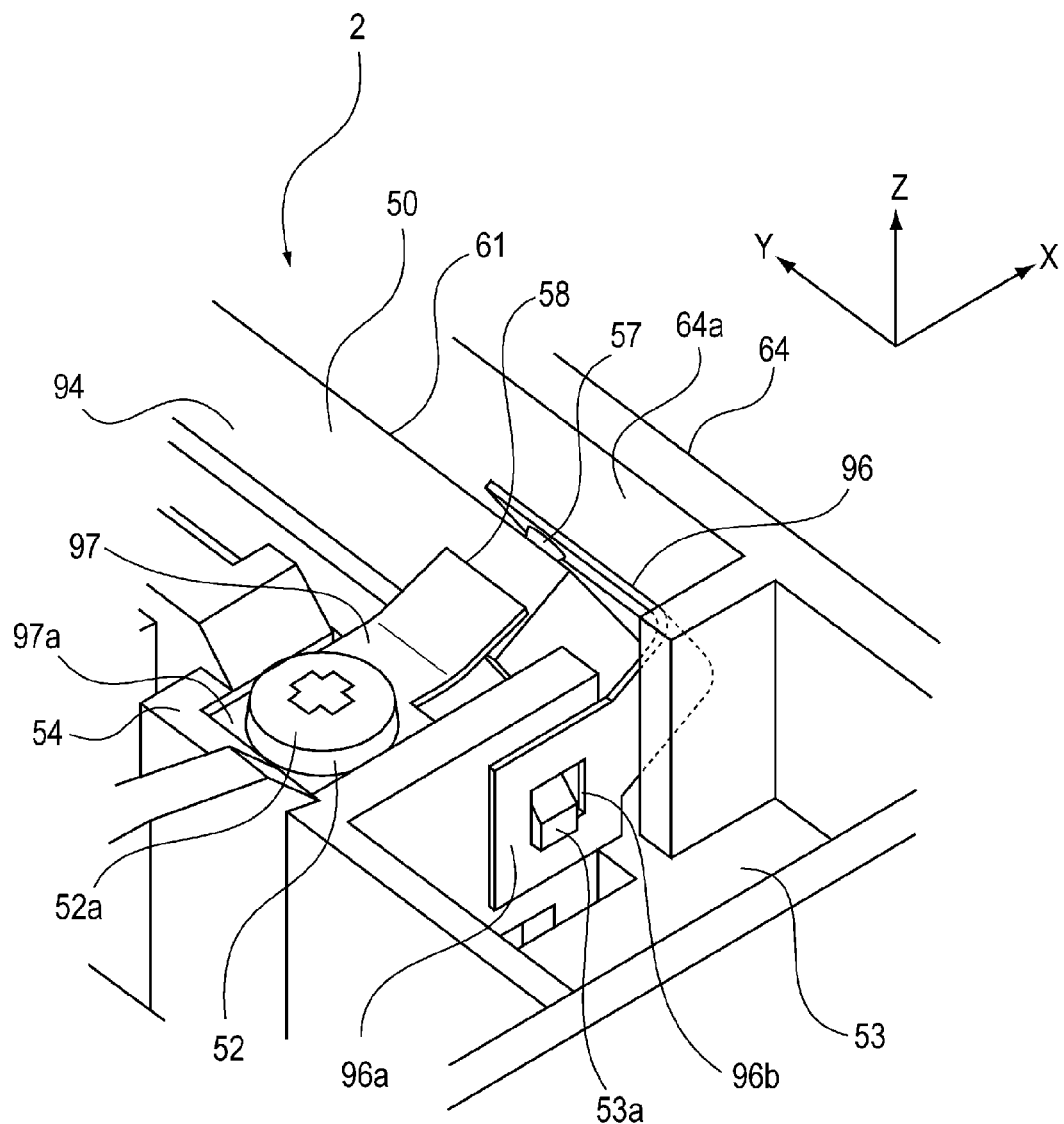
FIG. 9 is a perspective view of the primary and secondary regulating members of the optical scanning device in the fourth embodiment, which are disposed at the lengthwise ends, one for one, of the mirror of the device, and shows the structure of the primary and secondary regulating members.
Figure 10:
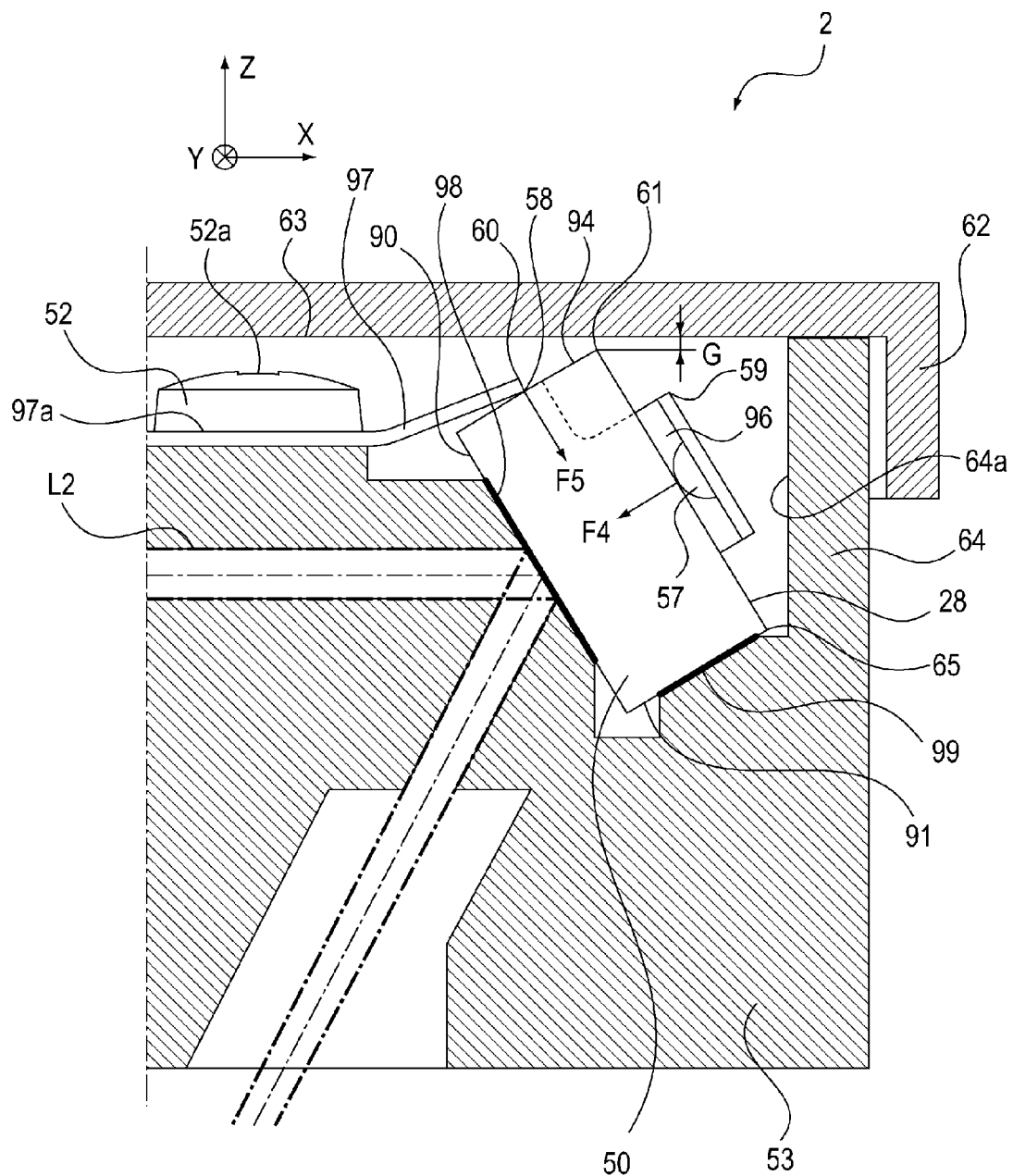
FIG. 10 is a sectional view of the mirror, and its adjacencies, of the optical scanning device in the fourth embodiment, and shows the structure of the mirror and its adjacencies.

Next, referring to FIGS. 9 and 10, the optical scanning device in the fourth embodiment of the present invention is described about its structure. The components of the optical scanning device in this embodiment, which are the same in structure as the counterparts in the preceding embodiments, are given the same referential codes and those given to the counterparts, one for one. Further, even if a given components of the optical scanning device in this embodiment is given a different referential code from the one given to the counterparts in the preceding embodiments, it is not described as long as it has the same name as the counterpart.

This embodiment is another modification of the second embodiment described above. In the second embodiment, the leaf spring 51 is bifurcated, having the elastic portions 55 and 56 (as primary and secondary regulating portions, respectively).

Referring to FIGS. 9 and 10, in this embodiment, the optical scanning device is provided with a leaf spring 96 (as primary regulating member) and a leaf spring 97 (as secondary regulating member), which are independent from each other. Referring to FIG. 9, the portion 96a of the leaf spring 96, by which the leaf spring 96 is fixed to the optical box 53, is provided with a square hole 96b, through which the protrusion 53a, with which the optical box 53 is provided, is put to fix the leaf spring 96 to the optical box 53.

Referring to FIG. 10, the leaf spring 96 fixed to the optical box 53 keeps the mirror 50 pressed on the primary seating surface 98, which is a part of the internal surface of the optical box 53, by applying a force F4 to the mirror 50. Further, the leaf spring 97 fixed to the optical box 53 by the small screw 52 keeps the mirror 50 pressed upon the secondary seating surface 99, which is a part of the internal surface of the optical box 53, by applying a force F5 to the mirror 50.

Also in this embodiment, the mirror 50 for reflecting the beam of laser light deflected by the rotational polygon mirror 22, is fixed to the optical box 53 by the leaf springs 96 and 97. The leaf spring 96 (as primary regulating member) which is an elastic member regulates the mirror 50 in the movement in the direction (opposite from direction indicated by arrow mark F4 in FIG. 10) perpendicular to the reflective surface 90 of the mirror 50. The leaf spring 97 (as secondary regulating member) which is an elastic member regulates the mirror in the movement in the secondary scan direction (opposite from direction indicated by arrow mark F5 in FIG. 10).

Further, the optical scanning device is structured so that the leaf spring 96 (as primary regulating member) opposes the surface 28 of the mirror 50, which is the opposite surface of the mirror 50 from the reflective surface 90 of the mirror 50 and is closer to the lid 62 than the reflective surface 90, and also, so that the leaf spring 97 (as secondary regulating member) is placed in contact with the top surface 94 of the mirror 50, which is closer to the lid 62 in terms of the secondary scan direction (indicated by arrow mark F5 in FIG. 10) of the beam of light than the opposite surface of the mirror 50 from the top surface 94.

Further, the leaf spring 96 (as primary regulating member) is positioned farther from the inward surface 63 of the lid 62 than the edge 61 of the mirror 50, which is closest to the lid 62, of the four long edges of the mirror 50, which correspond in position to the four corners of the cross-sectional view of the mirror 50 and extend in the direction parallel to the secondary scan direction (opposite from direction indicated by arrow mark F5 in FIG. 10) of the scanning beam of light. Further, the leaf spring 97 (as secondary regulating member), and the top surface 52a of the small screw 52, are positioned farther from the inward surface of the lid 62 than the edge 61 of the mirror 50.

The leaf spring 96 (as primary regulating member) is made of an elastic substance, and is in the form of a long and narrow piece of plate, and so is the leaf spring 97 (as secondary regulating member). Referring to FIG. 9, the leaf spring 96 extends in the lengthwise direction of the mirror 50, from the outward side of the lengthwise end of the mirror 50 toward the center of the mirror 50.

Also referring to FIG. 9, the leaf spring 97 is fixed to the optical box 53 with the use of the small screw 52. More concretely, the area of the optical box 53, to which the leaf spring 97 is fixed by its square base portion 97a, is surrounded by a protrusive portion 54, which is roughly U-shaped (in top view). The base portion 97a of the leaf spring 97 is fitted into the area surrounded by the protrusive portion 54 to prevent the problem that as the small screw 52 is rotated to be tightened, the leaf spring 97 is rotationally moved by the rotation of the small screw 52.

Next, referring to FIG. 10, the surface of the leaf spring 96, which is to face the surface 28 of the mirror 50, is provided with a mirror pressing portion 57, which is formed by embossing. It is by this pressing portion 57 that a force F4 is applied to the mirror 50 to keep the mirror 50 pressed upon the primary seating surface 98, which is an integral part of the internal surface of the optical box 53.

A mirror pressing portion 58, which is one of the edges of the leaf spring 97, applies a force F5 to the mirror 50 to keep the mirror 50 pressed upon the secondary seating surface 99, which is an integral part of the internal surface of the optical box 53. Also referring to FIG. 10, the edge 59 of the leaf spring 96, which is the closest portion of the leaf spring 96 to the lid 62, and the edge 60 of the leaf spring 97, which is the closest portion of the leaf spring 97 to the lid 62, and the top surface of the head portion of the small screw 52, are not protrusive upward beyond the edge 61 of the mirror 50, which is the closet portion of the mirror 50 to the lid 62 in terms of the direction parallel to the axis Z (upward direction in FIG. 10).

Thus, this embodiment allows the lid 62 to be placed infinitesimally close to the edge 61 of the mirror 50, which is the closest portion of the mirror 50 to the lid 62, in terms of the direction parallel to the axis Z, as does any of the preceding embodiments. Further, in this embodiment, the mirror 50 remains pressed upon the mirror seating secondary surface 99 by the leaf spring 97, and therefore, it does not occur that the mirror 50 is moved in the opposite direction from the direction indicated by the arrow mark F5 in FIG. 10, by impact. Therefore, this embodiment can further reduce the gap G between the edge 61 of the mirror 50 and the lid 61.

Referring to FIG. 9, the combination of the leaf springs 96 and 97 is positioned at each of the lengthwise ends of the mirror 50. The leaf spring 96 (as primary regulating member) extends in the direction parallel to the lengthwise direction (parallel to axis Y) of the mirror 50.

Referring to FIG. 10, this embodiment allows the surface 64a, which is the inward surface of a part of the external wall 64 of the optical box 53, to be placed infinitesimally close to the edge 65 of the mirror 50, which is the closest portion of the mirror 50 to the surface 64a. Thus, it allows an optical scanning device to be reduced in dimension in terms of the direction parallel to the axis X (left-right direction) in FIG. 10. Otherwise, the optical scanning device 2 in this embodiment is the same in structure as those in the preceding embodiments. That is, this embodiment can provide the same effects as those obtainable by the preceding embodiments.

Embodiment 5

Figure 11:
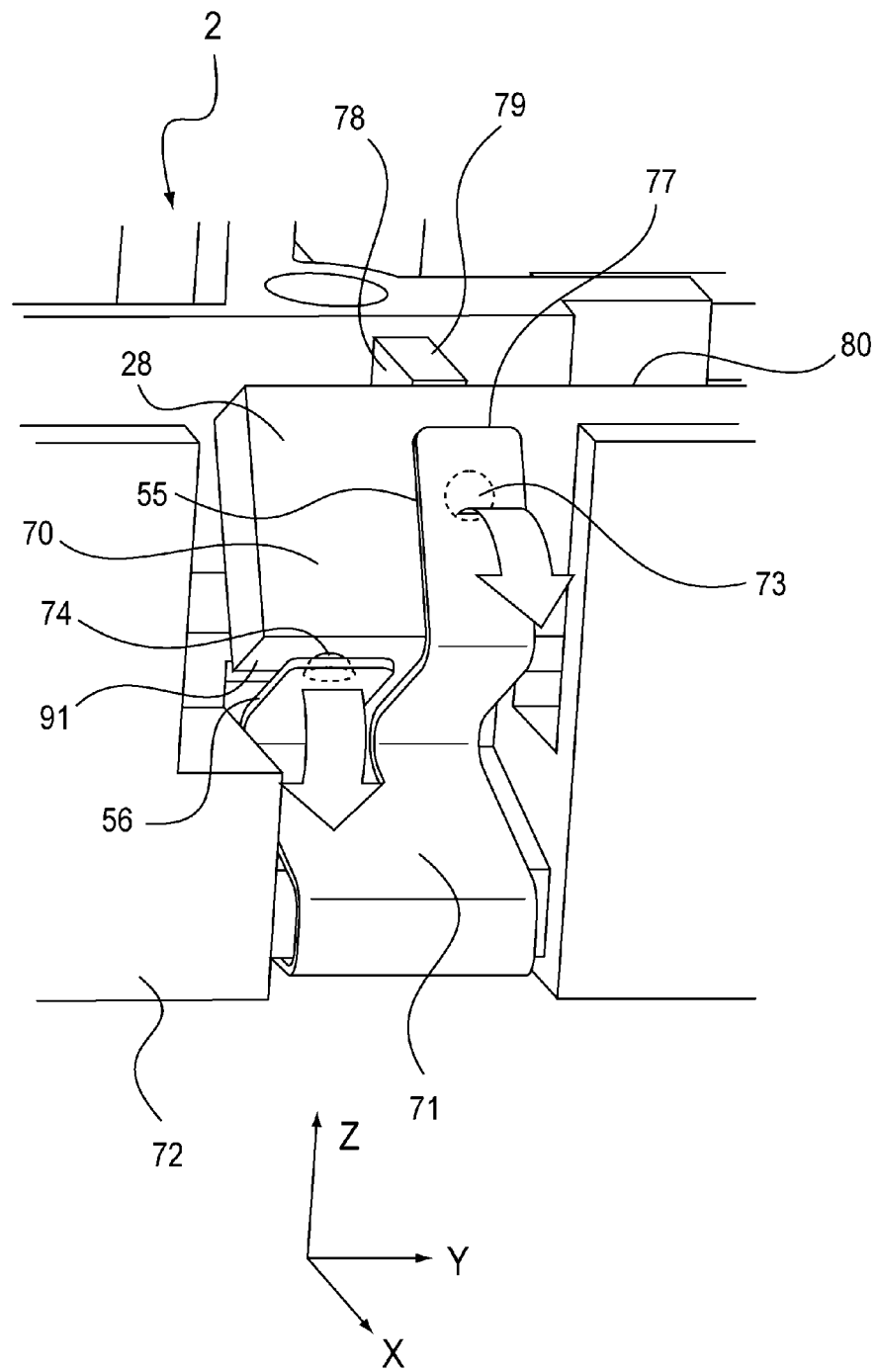
FIG. 11 is a perspective view of the primary and secondary regulating members of the optical scanning device in the fifth embodiment of the present invention, which are disposed at the lengthwise ends, one for one, of the mirror of the device, and shows the structure of the primary and secondary regulating members.
Figure 12:
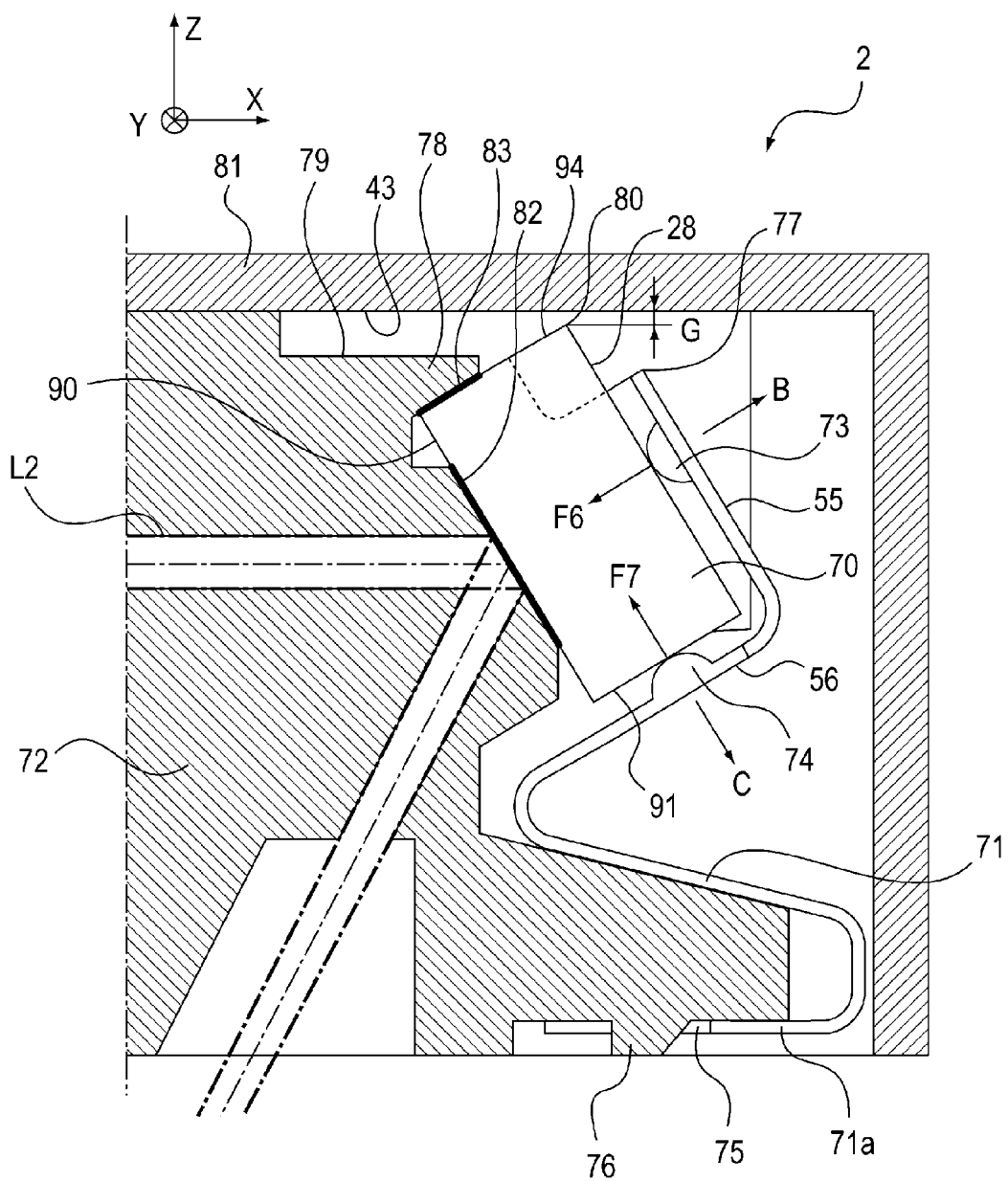
FIG. 12 is a sectional view of the optical scanning device in the fifth embodiment of the present invention, and shows the structure of the device, in particular, the structure of the mirror, and its adjacencies, of the device.

Next, referring to FIGS. 11 and 12, the optical scanning device in the fifth embodiment of the present invention is described about its structure. The components of this device, which are the same in structure as the counterparts in the preceding embodiments are given the same referential codes as those given to the counterparts, one for one, and are not described here. Further, as long as a given component of the optical scanning device in this embodiment is the same in structure as the counterpart in the preceding embodiments, it is not described even if it has a different referential code from the one given to the counterpart.

FIG. 11 is a perspective view of the portion of the optical scanning device 2 in this embodiment, to which the mirror 70 is fixed, and the adjacencies of the portion, and shows the structure of this portion and its adjacencies. FIG. 12 is a partially sectional view of the portion of the optical scanning device 2 in this embodiment, to which the mirror 70 is fixed, and the adjacencies of the portion, and shows the structure of this portion and its adjacencies.

The mirror 70 which reflects the beam of laser light deflected by the rotational polygon mirror 22 is fixed to the optical box 72 with the use of the leaf spring 71 having a pair of elastic portions 55 and 56. The elastic portion 55, which is the primary regulating portion, is formed of an elastic substance, and regulates the mirror 70 in the movement in the direction (opposite to direction indicated by arrow mark F6 in FIG. 12) perpendicular to the reflective surface 90 of the mirror 70. The elastic portion 56 which is the second regulatory portion, regulates the mirror 70 in the movement in the secondary scan direction (indicated by arrow mark F7 in FIG. 12).

The base portion 71a of the leaf spring 71 is provided with a hole 75. The optical box 72 is provided with a leaf spring anchoring portion 76, which is in the form of a protrusion. Thus, the leaf spring 71 is fixed to the optical box 72 by fitting the leaf spring anchoring portion 76 of the optical box 72 into the hole 75 of the base portion 71 of the leaf spring 71.

The leaf spring 71 is provided with a pair of elastic portions 55 and 56, which have mirror pressing portions 73 and 74, respectively. The pressing portion 73 applies a force F6 to the mirror 70 to keep the mirror 70 pressed upon the mirror seating primary surface 82, which is an integral part of the internal surface of the external wall of the optical box 72. The pressing portion 74 is for applying a force F7 to the mirror 70 to keep the mirror 70 pressed upon the mirror seating secondary surface 83, which is an integral part of the inward surface of the external wall of the optical box 72. The mirror seating secondary surface 82 is the referential surface for positioning the mirror 70 in terms of the secondary scan direction (indicated by arrow mark F in FIG. 12) of the beam of laser light.

Also in this embodiment, the optical scanning device is structured so that the elastic portion 55 which is the primary regulating portion faces the surface 28 of the mirror 50, which is the opposite surface of the mirror 50 from the reflective surface 90 of the mirror 50 and is closer to the inward surface of the lid 81 than the reflective surface 90. As for the secondary seating surface 83 which serves as the referential surface, it is an integral part of the top surface 94 and is positioned so that it faces the top surface 94 of the mirror 50, which is closer to the inward surface 43 of the lid 81, in terms of the secondary scan direction (indicated by arrow mark F7 in FIG. 12), than the bottom surface 91 of the mirror 50. Further, the elastic portion 56 which is the secondary regulating portion in this embodiment is placed in contact with the bottom surface 91 of the mirror 50, which is the surface of the mirror 50, which faces the optical box 72, on the opposite side of the mirror 50 from the inward surface 43 of the lid 83, in terms of the secondary scan direction (indicated by arrow mark F7 in FIG. 7).

Further, the edge 77 of the elastic portion 55 (as primary regulating portion), which is the closest portion of the elastic portion 55 to, to the inward surface 43 of the lid 81, is positioned farther from the edge 80 of the mirror 50, which is closest portion of the mirror 50 to the inward surface 43 of the lid 81, in terms of the secondary scan direction (indicated by arrow mark F7 in FIG. 12), of the four edges of the mirror 50, which extend in the primary scan direction (parallel to axis Y) and correspond in position to the four corners of the mirror 50 (which is rectangular in sectional view). Further, the topmost surface 79 of the mirror anchorage portion 78 having the secondary seating surface 83 which is the referential surface, is positioned farther from the inward surface of the lid 81 than the edge 80 of the mirror 50.

The elastic portion 55 which is the primary regulating portion, and the elastic portion 56 which is the secondary regulating portion, are in the form of a long and narrow piece of plate made of an elastic substance. The elastic portion 56 which functions as the secondary regulating portion may be an integral part of the optical box 72.

Referring to FIG. 11, the leaf spring 71 is bifurcated, having the two elastic portions 55 and 56. The elastic portions 55 and 56 are provided with mirror pressing portions 73 and 74, respectively, which oppose the surface 28 of the mirror 50, which is the opposite surface of the mirror 50 from the reflective surface 90 of the mirror 50, and the bottom surface 90 of the mirror 50. Both elastic portions 55 and 56 are formed by embossing.

Referring to 12, the mirror pressing portion 73 of the elastic portion 55 applies a force F6 to the mirror 70 to keep the mirror 70 pressed upon the primary seating surface 82, which is an integral part of the inward surface of the optical box 72. The elastic portion 56 applies a force F7 to the mirror 70 to keep the mirror 70 pressed upon the secondary seating surface 83, which is an integral part of the inward surface of the optical box 70.

Also referring to FIG. 12, the edge 77 of the lengthwise end of the elastic portion 55, which is the closest portion of the elastic portion 55 to the inward surface 43 of the lid 81, and the topmost surface 79 of the mirror anchorage portion 78 having the secondary seating surface 83, are not protrusive upward beyond the edge 80 of the mirror 70, in terms of the direction parallel to the axis Z (upward direction in FIG. 12). That is, in terms of the direction parallel to the axis Z, the edge 80 of the mirror 70 is closest to the inward surface 43 of the lid 81. Also in terms of the direction parallel to the axis Z, the edge 77 of the elastic portion 55, and the topmost surface of the mirror anchorage portion 78, are positioned farther from the lid 80 than the edge 80.

Therefore, this embodiment also allows the lid 81 to be positioned infinitesimally close to the edge 80 which is the closest portion of the mirror 70 to the inward surface 43 of the lid 81. Thus, it allows an optical scanning device to be reduced in size.

In this embodiment, the optical scanning device 2 was structured so that the lid 81 and edge 80 can be positioned as close as possible to each other, in terms of the direction parallel to the axis Z. However, this embodiment is not intended to limit the present invention in terms of the structure of an optical scanning device. For example, an optical scanning device may be structured so that the edge 80 which is the closest portion of the mirror 70 to the lid 81 is positioned as close as possible to the lid 81 in terms of a preset direction which is perpendicular to the primary scan direction (which is parallel to axis Y). This structural arrangement can also reduce an optical scanning device, and an image forming apparatus employing an optical scanning device, in dimension in terms of a preset direction which is perpendicular to the primary scan direction (direction of axis Y).

Also in this embodiment, it is by the elastic portion 56 that the mirror 70 is kept pressed upon the secondary seating surface 83. Therefore, it does not occur that the mirror 70 is moved in the opposite direction from the direction indicated by the arrow mark F7 in FIG. 12 by impact. Therefore, this embodiment can further reduce the gap G between the inward surface 43 of the lid 81, and the edge 80 of the mirror 70, which is the closest portion of the mirror 70 to the inward surface of the lid 81, than the first embodiment.

Further, this embodiment is the same as the second embodiment in that both the mirror pressing portion (73) for pressing the mirror (70) toward the primary seating surface (82), and the mirror pressing portion (74) for pressing the mirror (70) toward the secondary seating surface (83), are integral parts of the leaf spring (71). In this embodiment, the directions indicated by arrow marks B and C, which are the directions in which the elastic portions 55 and 56 having the two mirror pressing portions 73 and 74, respectively, bend, are parallel to the planes X and Z which coincide with the axes X and Z, respectively. Therefore, it does not occur that the leaf spring 71 becomes twisted. Therefore, it is ensured that the preset amount of pressure which is applied to the mirror 70 by the leaf spring 71 to keep the mirror 70 pressed upon the mirror sealing surface remains stable. Otherwise, this embodiment is the same as the preceding embodiments, in the structure of the components, such as the mirror regulating secondary member (portion), of the optical scanning device. The effects of this embodiment are the same as those obtainable by the preceding embodiments.

The preceding embodiments of the present invention are not intended to limit the present invention in scope. The present invention encompasses various modifications of the preceding embodiments, within the gist of the present invention. For example, the regulating member such as the mirror regulating secondary member does not need to be a leaf spring; it may be an integral part of the optical box. Further, the means for fixing the leaf spring to the optical box may be different in structure from those in the preceding embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 015921/2013 filed Jan. 30, 2013 which is hereby incorporated by reference.

What is claimed is:

1. An optical scanning apparatus comprising:
   a light source;
   a light deflector for deflecting a light beam emitted from said light source;
   a mirror for reflecting the beam deflected by said light deflector;
   an optical box and a closing member mounted to said optical box, wherein said mirror is accommodated in a space defined by said optical box and said closing member;
   a pressing member for pressing said mirror to a seating surface of said optical box and for regulating a movement of said mirror in a direction of a normal line of a reflecting surface of said mirror; and
   a regulating portion for regulating movement of said mirror in a direction which is parallel to the seating surface and in which the mirror approaches the closing member, said regulating portion being disposed in a position opposed to a surface of said mirror which is perpendicular to a said reflecting surface of said mirror and which is closer to said closing member than another surface of said mirror which is perpendicular to said reflecting surface of said mirror,
   wherein said mirror has a plurality of apex lines, and said pressing member and said regulating portion are disposed at positions which are remoter from said closing member than the apex line that is closest to said closing member, with respect to a direction perpendicular to a surface of the closing member.

2. An optical scanning apparatus according to claim 1, wherein said regulating portion includes an elastic member.

3. An optical scanning apparatus according to claim 1, wherein said pressing member and said regulating portion are provided on a common member.

4. An optical scanning apparatus according to claim 1, wherein said pressing member is a leaf spring.

5. An optical scanning apparatus according to claim 4, wherein said leaf spring bifurcates into two portions and one portion is said pressing member.

6. An optical scanning apparatus according to claim 5, wherein the other portion is said regulating portion.

7. An image forming apparatus comprising:
   a photosensitive member; and
   an optical scanning apparatus according to claim 1,
   wherein said mirror reflects the beam deflected by said rotatable polygonal mirror toward said photosensitive member.

8. An optical scanning apparatus comprising:
   a light source;
   a rotatable polygonal mirror for deflecting a beam from said light source;
   a mirror for reflecting the beam deflected by said rotatable polygonal mirror;
   an optical box and a closing member mounted to said optical box, wherein said mirror is accommodated in a space defined by said optical box and said closing member;
   a regulating portion for regulating a movement of said mirror in a direction of a normal line of a reflecting surface of said mirror, said regulating portion being provided opposed to a back surface of said mirror which is closer to said closing member than said reflecting surface; and a reference portion for positioning said mirror in a beam sub-scan direction of said mirror, said reference portion being provided opposed a surface of said mirror which is perpendicular to the reflecting surface of said mirror and which is closer to said closing member than another surface of said mirror which is perpendicular to said reflecting surface of said mirror;

wherein said mirror has a plurality of apex lines, and said regulating portion and said reference portion are disposed at positions which are remoter from said closing member than the apex line that is closest to said closing member, with respect to a direction perpendicular to a main scan direction.

9. An optical scanning apparatus according to claim 8, further comprising:

said regulating portion serving as a first regulating portion; and a second regulating portion for regulating a movement of said mirror in the sub-scanning direction, said second regulating portion being provided on a surface facing said optical box opposing said closing member with respect to the sub-scan direction.

10. An optical scanning apparatus according to claim 9, wherein said second regulating portion includes an elastic member.

11. An optical scanning apparatus according to claim 9, wherein said first regulating portion is integral with said second regulating portion.

12. An optical scanning apparatus according to claim 9, wherein said second regulating portion contacts said mirror.

13. An optical scanning apparatus according to claim 9, wherein said second regulating portion is integrally molded with said optical box.

14. An optical scanning apparatus according to claim 8, wherein said reference portion is integrally molded with said optical box.

15. An optical scanning apparatus according to claim 8, wherein the direction perpendicular to the main scan direction is parallel with a rotational axial direction of said rotatable polygonal mirror.

16. An image forming apparatus comprising:
a photosensitive member; and
an optical scanning apparatus according to claim 8, wherein said mirror reflects the beam deflected by said rotatable polygonal mirror toward said photosensitive member.

17. An optical scanning apparatus comprising:
a light source;
a light deflector for deflecting a light beam emitted from said light source;
a mirror for reflecting the beam deflected by said light deflector;
an optical box and a closing member mounted to said optical box, wherein said mirror is accommodated in a space defined by said optical box and said closing member;
a pressing member for pressing said mirror to a seating surface of said optical box and for regulating a movement of said mirror in a direction of a normal line of a reflecting surface of said mirror; and
a contact portion contacting the mirror in a case the mirror moves toward the closing member and slides along the seating surface, said contact portion being disposed in a position opposed to a plane which is perpendicular to a reflection surface of said mirror,
wherein the contact portion regulates movement of said mirror in a direction which is parallel to the seating surface and in which the mirror approaches the closing member,
wherein said pressing member and said contact portion are disposed at positions which are remoter from said closing member than a apex line of said mirror that is closest to said closing member, with respect to a direction perpendicular to a surface of the closing member.

18. An optical scanning apparatus according to claim 17, wherein a gap $\delta$ in the sub-scan direction is provided between said contact portion and said mirror.

19. An optical scanning apparatus according to claim 18, wherein the gap $\delta$, an effective reflection length E of said mirror in the sub-scan direction, and a diameter D of a beam in the sub-scanning direction satisfy, $\delta<(E-D)/2.$ 20. An optical scanning apparatus according to claim 17, wherein said contact portion is integrally molded with said optical box or said closing member.

21. An optical scanning apparatus according to claim 17, wherein the direction perpendicular to the main scan direction is parallel with a rotational axial direction of said rotatable polygonal mirror.

* * * * *